Dec. 22, 1931.  C. H. SEAHOLM  1,837,889
TALKING MOTION PICTURE APPARATUS
Filed Nov. 18, 1930
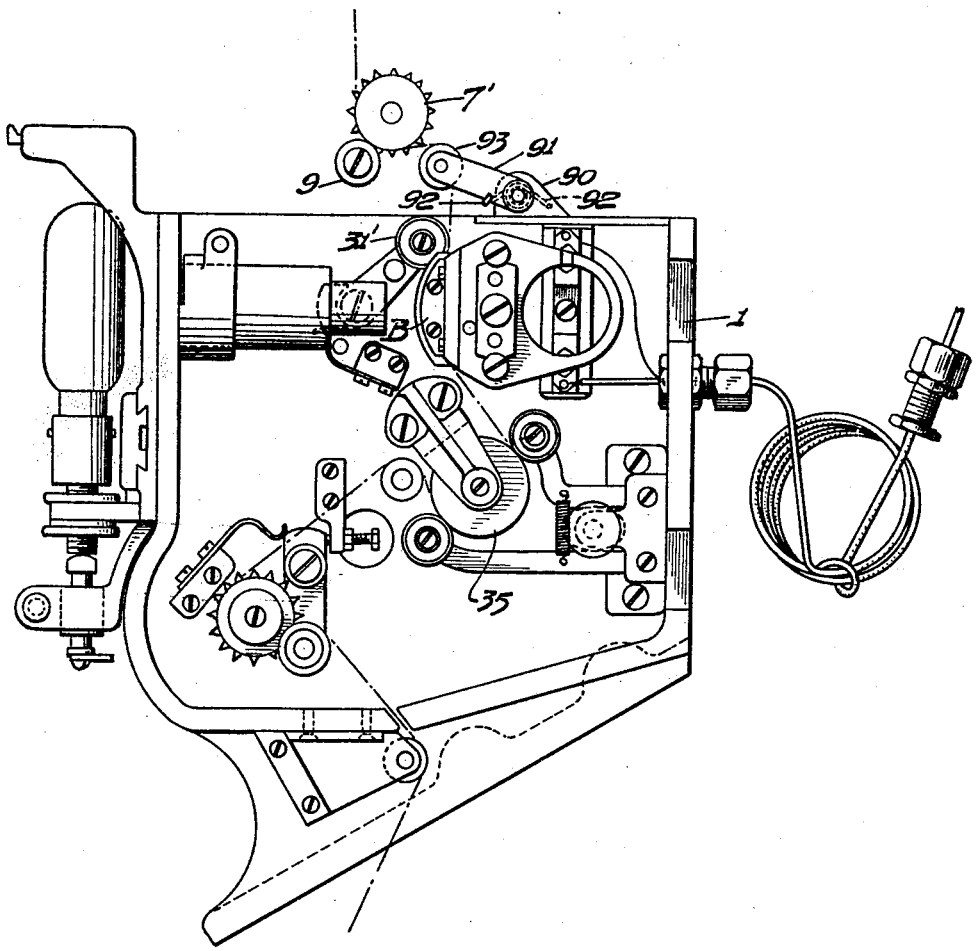
Inventor
Charles Hugo Seaholm
By David Pelton Moore
Attorney Patented Dec. 22, 1931

1,837,889

UNITED STATES PATENT OFFICE

CHARLES HUGO SEAHOLM, OF NEW YORK, N. Y., ASSIGNOR TO GENERAL TALKING PICTURES CORPORATION, OF NEW YORK, N. Y., A CORPORATION OF DELAWARE

TALKING MOTION PICTURE APPARATUS

Original application filed November 8, 1929, Serial No. 405,743. Divided and this application filed November 18, 1930. Serial No. 496,510.

The present invention relates to improvements in talking motion picture apparatus and is a division of the application filed November 8th, 1929, Serial No. 405,743.

One object of this invention is the provision of a sound-on-film sound head attachment for motion picture projectors in which there is provided a spring actuated arm supporting an idler to normally hold in tension the film at a point below the lower constant speed sprocket wheel of the motion picture projector and before the same enters the sound head.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the invention.

In the accompanying drawing there is illustrated a side elevation of the complete sound head and the lower portion of the motion picture projector, with the lid of the former removed to show the interior mechanism.

Referring to the drawing:—

There is a toothed sprocket wheel 7' around a portion of which the film passes and against which it is held by means of a small roller 9. It has been found in practise that the shaft which carries the sprocket 7' is not always, nor is it made of sufficiently hard steel to wear smoothly, and therefore, this sprocket often causes a jerky movement in the film which cannot be taken care of by a fly wheel or the like but which in practise can be or is eliminated by the idler 93 over which the film is directed before being engaged by the upper roller 31', the latter of which is held toward the curved slit block B so as to guide the film thereon but not hold the film in close contact with the slit block.

The other mechanism within the sound head 1 constitutes a film progressing means having a lower sprocket roller 10 driven in timed relation with the sprocket 7' so that the film may be operated primarily by the latter sprocket, and thus impart with the various intermediate rollers a constant speed to the film within the sound head.

This idler 93 is supported from a lug 90, and a portion of the casing tube and to which is pivoted an arm 91 held normally upwardly in tension by means of a spring 92. By this means a slight tension is imparted to the idler 93 so that the film is held taut at this point, and any unevenness that may be imparted to the film by the sprocket 7' is ironed out. The usual spinwheel with flywheel can thereby be dispensed with, said flywheel being usually attached to the spinwheel roller 35 but being necessary when the idler above set forth is employed.

What is claimed is:

1. In a talking motion picture attachment, the combination with a motion picture projector having a lower film feeding sprocket wheel, of a sound head attachment in cooperative relation thereto, a slit block mounted in said latter attachment, a sprocket wheel mounted in the attachment and cooperatively engaged with the first sprocket wheel so that the two are rotated in unison and a film guiding means interposed between the lower film feeding sprocket and the slit block and having resilient means for smoothing out any irregularities due to the feeding of the film over the first sprocket wheel and before passing the slit block.

2. In the combination as claimed in claim 1, in which the latter means include an idler, and a spring actuated arm supporting the idler to hold the idler normally under tension while engaging the film at a point adjacent the first sprocket wheel.

3. The combination with a motion picture projector having a lower film feeding sprocket wheel, of a sound head attachment including a casing, a resiliently supported idler carried by the casing and adapted to engage the film adjacent said sprocket, a removable slit block mounted in the casing below the idler and provided with a curved surface over which the film passes, a resiliently mounted film contacting roller interposed between the idler and the slit block and in opposition to the idler, a smooth roller mounted in a fixed journal in the casing and below the slit block and co-acting with the idler and first roller for holding the film in close contact with the slit block, a second film feeding sprocket wheel mounted in the casing below the smooth roller and resilient rollers and under manual control for holding the film in contact with the smooth roller, and means for operating the two sprocket wheel simultaneously.

In testimony whereof I affix my signature.

CHARLES HUGO SEAHOLM.